(12) United States Patent
Iwata et al.

(10) Patent No.: US 8,875,396 B2
(45) Date of Patent: Nov. 4, 2014

(54) MANUFACTURING METHOD FOR TOOTHED PART AND MANUFACTURING DEVICE FOR TOOTHED PART

(75) Inventors: Daisuke Iwata, Nishio (JP); Tomoyuki Hori, Anjo (JP); Naoki Yokoyama, Nishio (JP); Hiroshi Shibata, Takahama (JP); Masayuki Maki, Nisshin (JP)

(73) Assignee: Aisin AW Co., Ltd., Anjo (JP)

(\*) Notice: Subject to any disclaimer, the term of this patent is extended or adjusted under 35 U.S.C. 154(b) by 178 days.

(21) Appl. No.: 13/365,661

(22) Filed: Feb. 3, 2012

(65) Prior Publication Data
US 2012/0240405 A1    Sep. 27, 2012

(30) Foreign Application Priority Data

Mar. 24, 2011  (JP) .................................. 2011-066334

(51) Int. Cl.
*B21D 53/28* (2006.01)
*B21K 1/30* (2006.01)
*B23P 15/14* (2006.01)

(52) U.S. Cl.
CPC ................. *B21D 53/28* (2013.01); *B23P 15/14* (2013.01); *B21K 1/30* (2013.01)
USPC ............................. 29/893.33; 29/893; 72/469

(58) Field of Classification Search
CPC ........ B21D 22/10; B21D 22/28; B21D 22/30; B21D 53/28; B02J 13/02; B21K 1/30; B21K 1/32; B23P 15/14
USPC .......................... 29/893.3, 893.33–36; 72/469
See application file for complete search history.

(56) References Cited

U.S. PATENT DOCUMENTS

| | | | | |
|---|---|---|---|---|
| 4,876,876 A | * | 10/1989 | Ishida et al. | 72/348 |
| 6,016,602 A | * | 1/2000 | Kanemitsu et al. | 29/893.32 |
| 6,233,999 B1 | * | 5/2001 | Yabutani et al. | 72/354.8 |
| 2005/0278952 A1 | * | 12/2005 | Ooka | 29/893 |
| 2006/0016075 A1 | * | 1/2006 | Oki et al. | 29/893.34 |
| 2007/0284212 A1 | | 12/2007 | Sano et al. | |
| 2013/0318792 A1 | * | 12/2013 | Iwata et al. | 29/893.34 |
| 2014/0000334 A1 | * | 1/2014 | Iwata et al. | 72/352 |

FOREIGN PATENT DOCUMENTS

| | | |
|---|---|---|
| EP | 2 656 939 A1 | 10/2013 |
| EP | 2 656 940 A1 | 10/2013 |
| JP | A-57-58940 | 4/1982 |
| JP | A-57-139432 | 8/1982 |

(Continued)

OTHER PUBLICATIONS

Jun. 5, 2012 International Search Report issued in International Patent Application No. PCT/JP2012/054186 (with translation).

(Continued)

*Primary Examiner* — Alexander P Taousakis
(74) *Attorney, Agent, or Firm* — Oliff PLC

(57) ABSTRACT

A manufacturing method for a toothed part including a bottom surface portion and a side wall portion provided to extend upright from an outer peripheral end portion of the bottom surface portion, the side wall portion being formed with teeth. The manufacturing method includes a half drawing process of performing draw shaping on a material having a disk shape to form the bottom surface portion and the side wall portion, an inside diameter of which becomes larger in a direction away from the bottom surface portion; and a tooth shaping process of forming the teeth in the side wall portion.

10 Claims, 22 Drawing Sheets

(56) References Cited

FOREIGN PATENT DOCUMENTS

| JP | A-63-165024 | 7/1988 |
| JP | A-64-35123 | 2/1989 |
| JP | A-3-288018 | 12/1991 |
| JP | A-2006-116593 | 5/2006 |
| JP | A-2007-160333 | 6/2007 |

OTHER PUBLICATIONS

Jul. 14, 2014 Extended Search Report issued in European Patent Application No. 12760605.1.

* cited by examiner

F I G . 11
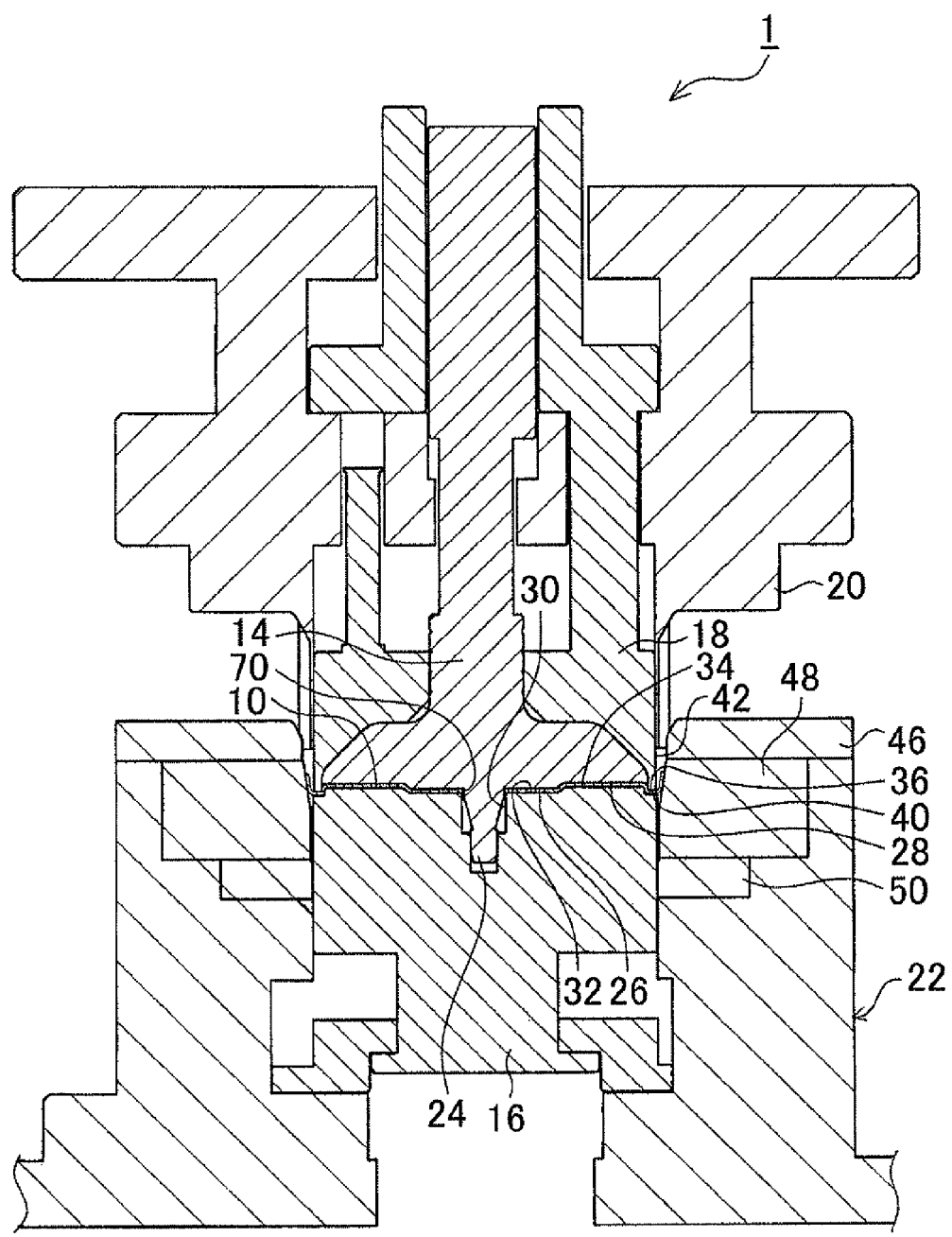

F I G . 18
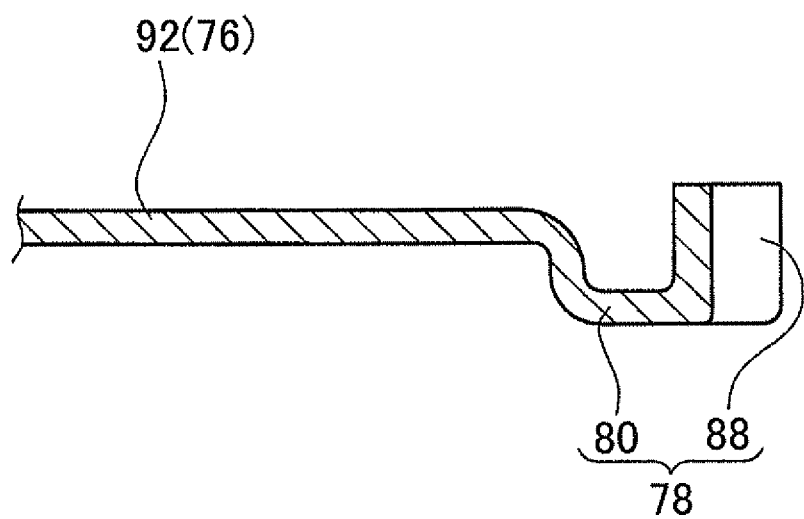

MANUFACTURING METHOD FOR TOOTHED PART AND MANUFACTURING DEVICE FOR TOOTHED PART

INCORPORATION BY REFERENCE

The disclosure of Japanese Patent Application No. 2011-066334 filed on Mar. 24, 2011 including the specification, drawings and abstract is incorporated herein by reference in its entirety.

BACKGROUND OF THE INVENTION

The present invention relates to a manufacturing method for a toothed part including a bottom surface portion and a side wall portion in an annular shape provided to extend upright in the axial direction from an outer peripheral end portion of the bottom surface portion and formed with teeth, and to a manufacturing device for the toothed part.

DESCRIPTION OF THE RELATED ART

Japanese Patent Application Publication No. 2006-116593 discloses a method and a device for manufacturing a toothed part (cup-shaped part) including a bottom surface portion and a side wall portion in an annular shape from a workpiece which is a flat disk-shaped material. Japanese Patent Application Publication No. 2006-116593 discloses that draw shaping and tooth shaping are performed with a round punch (drawing punch sleeve) for draw shaping of the workpiece disposed via a compression punch sleeve on the outer side of a toothed punch (first punch) used to form teeth in the side wall portion.

SUMMARY OF THE INVENTION

In the method and device for manufacturing a toothed part disclosed in Japanese Patent Application Publication No. 2006-116593, however, the round punch is disposed via the compression punch sleeve on the outer side of the toothed punch, which may complicate the structure of shaping dies.

Thus, if it is attempted to perform draw shaping using the toothed punch and a die, a toothed portion of the toothed punch may contact the workpiece at a point. Therefore, a tensile stress may be caused at the point of the workpiece contacted by the toothed portion, which may thin the workpiece (reduce the thickness of the workpiece). If the workpiece is thinned in this way, a toothed part in a desired shape with a sufficient thickness may not be manufactured.

The present invention has been made to address the foregoing issues, and therefore has an object to provide a manufacturing method for a toothed part that allows manufacture of a toothed part in a desired shape using shaping dies with a simple structure, and a manufacturing device for the toothed part.

In order to address the foregoing issues, an aspect of the present invention provides a manufacturing method for a toothed part including a bottom surface portion and a side wall portion provided to extend upright from an outer peripheral end portion of the bottom surface portion, the side wall portion being formed with teeth The manufacturing method for a toothed part includes: a half drawing process of performing draw shaping on a material having a disk shape to form the bottom surface portion and the side wall portion, an inside diameter of which becomes larger in a direction away from the bottom surface portion; and a tooth shaping process of forming the teeth in the side wall portion.

According to the aspect, the side wall portion is formed such that its inside diameter becomes larger in the direction away from the bottom surface portion in the half drawing process. Thus, the draw shaping can be performed with a force applied to the material suppressed. Therefore, thinning of the material can be prevented. Thus, the toothed part in a desired shape can be manufactured using shaping dies with a simple structure.

In the aspect described above, the tooth shaping process may include using a toothed punch to form the teeth in the side wall portion, and the half drawing process may include forming the side wall portion using the toothed punch and a drawing die disposed outward of the toothed punch.

According to the aspect, it is not necessary to use a punch exclusively for drawing in the half drawing process. Thus, the structure of the shaping dies can be simplified.

In the aspect described above, an inner peripheral surface of the drawing die may be provided with a tapered portion, an inside diameter of which becomes smaller in a direction in which the toothed punch relatively moves with respect to the drawing die in the half drawing process.

According to the aspect, the material is drawn along the tapered portion. Thus, the draw shaping is performed smoothly, which prevents thinning of the material.

In the aspect described above, the manufacturing method for a toothed part further may include a diameter reducing process of reducing the inside diameter of the side wall portion formed in the half drawing process, and the diameter reducing process may be followed by the tooth shaping process.

According to the aspect, the diameter reducing process is performed between the half drawing process and the tooth shaping process. Thus, diameter-reducing shaping can be performed on the material by gradually reducing the inside diameter of the side wall portion. Therefore, the diameter-reducing shaping can be naturally performed on the material, which prevents thinning of the material.

In the aspect described above, the diameter reducing process may include disposing a diameter reducing die, an inner peripheral surface of which is formed with teeth, outward of the toothed punch to form the teeth in the side wall portion.

According to the aspect, teeth can be gradually formed in the side wall portion also in the diameter reducing process. Thus, teeth can be naturally formed in the material. Therefore, thinning of the material can be prevented.

In order to address the foregoing issues, another aspect of the present invention provides a manufacturing device for a toothed part including a bottom surface portion and a side wall portion provided to extend upright from an outer peripheral end portion of the bottom surface portion, the side wall portion being formed with teeth. The manufacturing device for a toothed part includes: a toothed punch, on an outer peripheral surface of which teeth are formed; a drawing die including a draw shaping hole for insertion of the toothed punch; and a toothed die including a tooth shaping hole for insertion of the toothed punch, in which the toothed punch is inserted into the draw shaping hole and relatively moved with respect to the drawing die to perform draw shaping on a material having a disk shape in order to form the bottom surface portion and the side wall portion, an inside diameter of which becomes larger in a direction away from the bottom surface portion, and the toothed punch is inserted into the tooth shaping hole and relatively moved with respect to the toothed die to form the teeth in the side wall portion.

In the aspect described above, an inner peripheral surface of the drawing die may be provided with a tapered portion, an inside diameter of which becomes smaller in a direction in which the toothed punch relatively moves with respect to the drawing die when the draw shaping is performed on the material.

According to the manufacturing method for a toothed part and the manufacturing device for a toothed part of the present invention, it is possible to manufacture a toothed part in a desired shape using shaping dies with a simple structure.

BRIEF DESCRIPTION OF THE DRAWINGS

FIG. 11 shows the overall configuration of the manufacturing device for a toothed part in a reduced-diameter tooth shaping process;

FIG. 18 is an enlarged cross-sectional view of the outer circumferential portion of the workpiece after the thickened tooth shaping process is performed;

DETAILED DESCRIPTION OF THE EMBODIMENTS

An embodiment of the present invention will be described in detail below with reference to the accompanying drawings.

[Configuration of Manufacturing Device]

First, the configuration of a manufacturing device 1 for a toothed part according to the embodiment will be described. The manufacturing device 1 for a toothed part shapes a workpiece 10 which is a flat disk-shaped material to manufacture a toothed part 12 (see FIG. 17).

Figure 1:
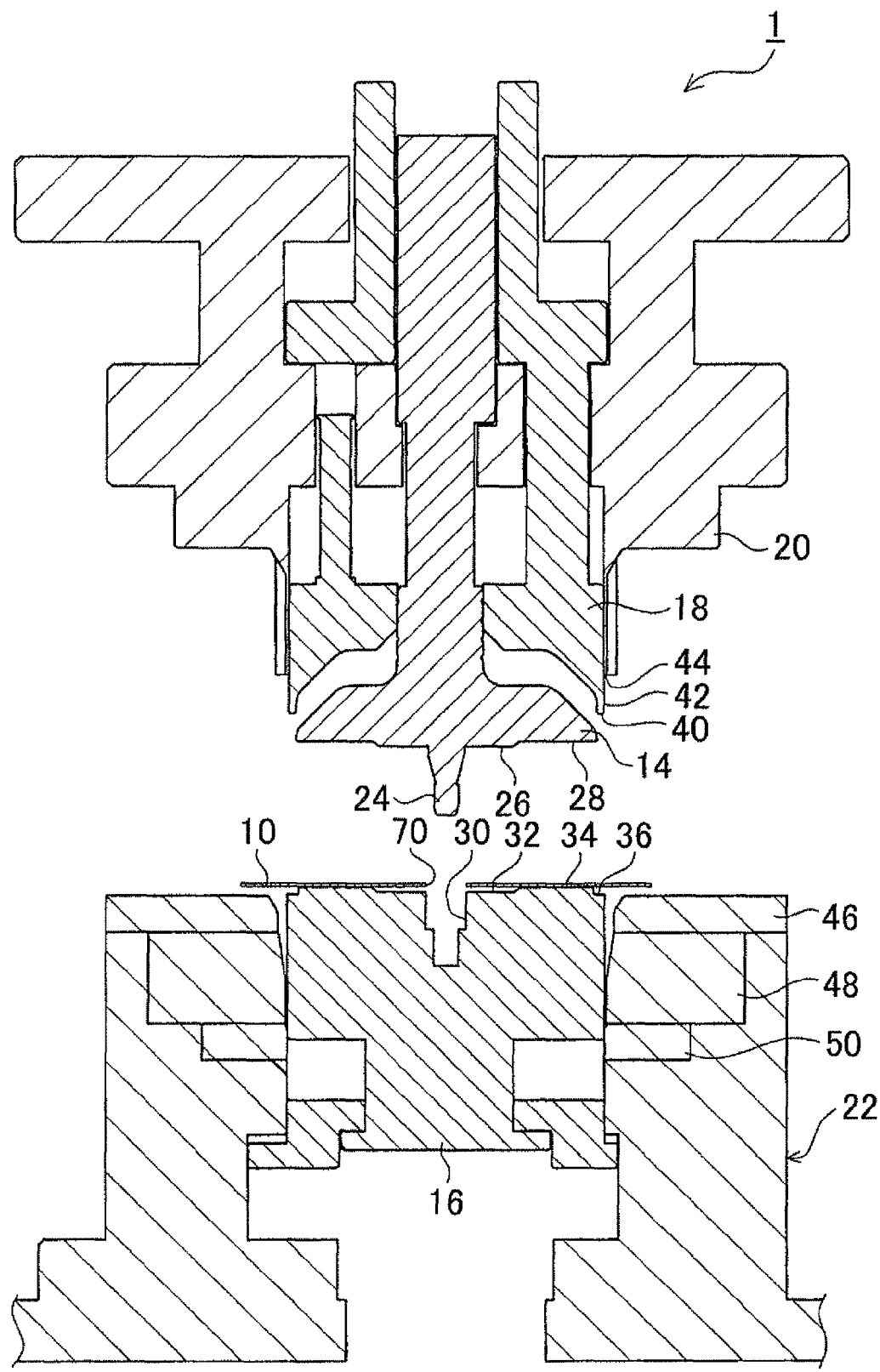
FIG. 1 shows the overall configuration of a manufacturing device for a toothed part in a workpiece placement process.

FIG. 1 shows the overall configuration of the manufacturing device 1 for a toothed part. FIG. 1 shows a state in a workpiece placement process to be discussed later. As shown in FIG. 1, the manufacturing device 1 for a toothed part includes a first restraint punch 14, a second restraint punch 16, a toothed punch 18, a compression punch 20, and a die portion 22.

The first restraint punch 14 is disposed at a position at which it faces the second restraint punch 16 (at a position on the upper side of FIG. 1). A surface of the first restraint punch 14 facing the second restraint punch 16 is formed to have a circular outer shape. The surface of the first restraint punch 14 includes a projecting portion 24, a first distal-end surface 26, a second distal-end surface 28, and so forth.

The projecting portion 24 is provided at the center portion of the surface of the first restraint punch 14 facing the second restraint punch 16, and shaped to project more toward the second restraint punch 16 (downward in FIG. 1) than the first distal-end surface 26 and the second distal-end surface 28. The first distal-end surface 26 is provided at a position circumferentially outward of the first restraint punch 14 (in the left-right direction of FIG. 1) with respect to the projecting portion 24. The second distal-end surface 28 is provided at a position circumferentially outward of the first restraint punch 14 (in the left-right direction of FIG. 1) with respect to the first distal-end surface 26. The first distal-end surface 26 is provided at a position more toward the second restraint punch 16 (downward in FIG. 1) than the second distal-end surface 28.

The second restraint punch 16 is disposed at a position at which it faces the first restraint punch 14 (at a position on the lower side of FIG. 1). A surface of the second restraint punch 16 facing the first restraint punch 14 is formed to have a circular outer shape. The surface of the second restraint punch 16 includes a recessed portion 30, a first distal-end surface 32, a second distal-end surface 34, a circumferentially outward facing surface 36, and so forth.

The recessed portion 30 is provided at the center portion of the surface of the second restraint punch 16 facing the first restraint punch 14, and shaped to be recessed in the direction opposite to the direction of the first restraint punch 14 (downward in FIG. 1) with respect to the first distal-end surface 32 and the second distal-end surface 34. The first distal-end surface 32 is provided at a position circumferentially outward of the second restraint punch 16 (in the left-right direction of FIG. 1) with respect to the recessed portion 30. The second distal-end surface 34 is provided at a position circumferentially outward of the second restraint punch 16 with respect to the first distal-end surface 32. The circumferentially outward facing surface 36 is provided at a position circumferentially outward of the second restraint punch 16 with respect to the second distal-end surface 32. The second distal-end surface 34 is provided at a position more toward the first restraint punch 14 (upward in FIG. 1) than the first distal-end surface 32 and the circumferentially outward facing surface 36.

The toothed punch 18 is disposed on the outer side of the first restraint punch 14. The toothed punch 18 is provided with a distal-end surface 40 facing the second restraint punch 16. The distal-end surface 40 is provided along the shape of the outer periphery of the toothed punch 18, and provided at a position at which it faces the circumferentially outward facing surface 36 of the second restraint punch 16. An outer peripheral surface 42 of the toothed punch 18 is formed in a toothed shape in order to form teeth in a reduced-diameter side wall portion 86 (see FIG. 15) together with a reduced-diameter tooth shaping die 48 to be discussed later.

The compression punch 20 is disposed on the outer side of the outer peripheral surface 42 of the toothed punch 18. The compression punch 20 is provided with a distal-end surface 44 facing the second restraint punch 16. The distal-end surface 44 is formed in a toothed shape, and provided at a position at which it faces a chamfer shaping portion 68 (see FIG. 2) of a backing plate 50 of the die portion 22 to be discussed later.

Figure 2:
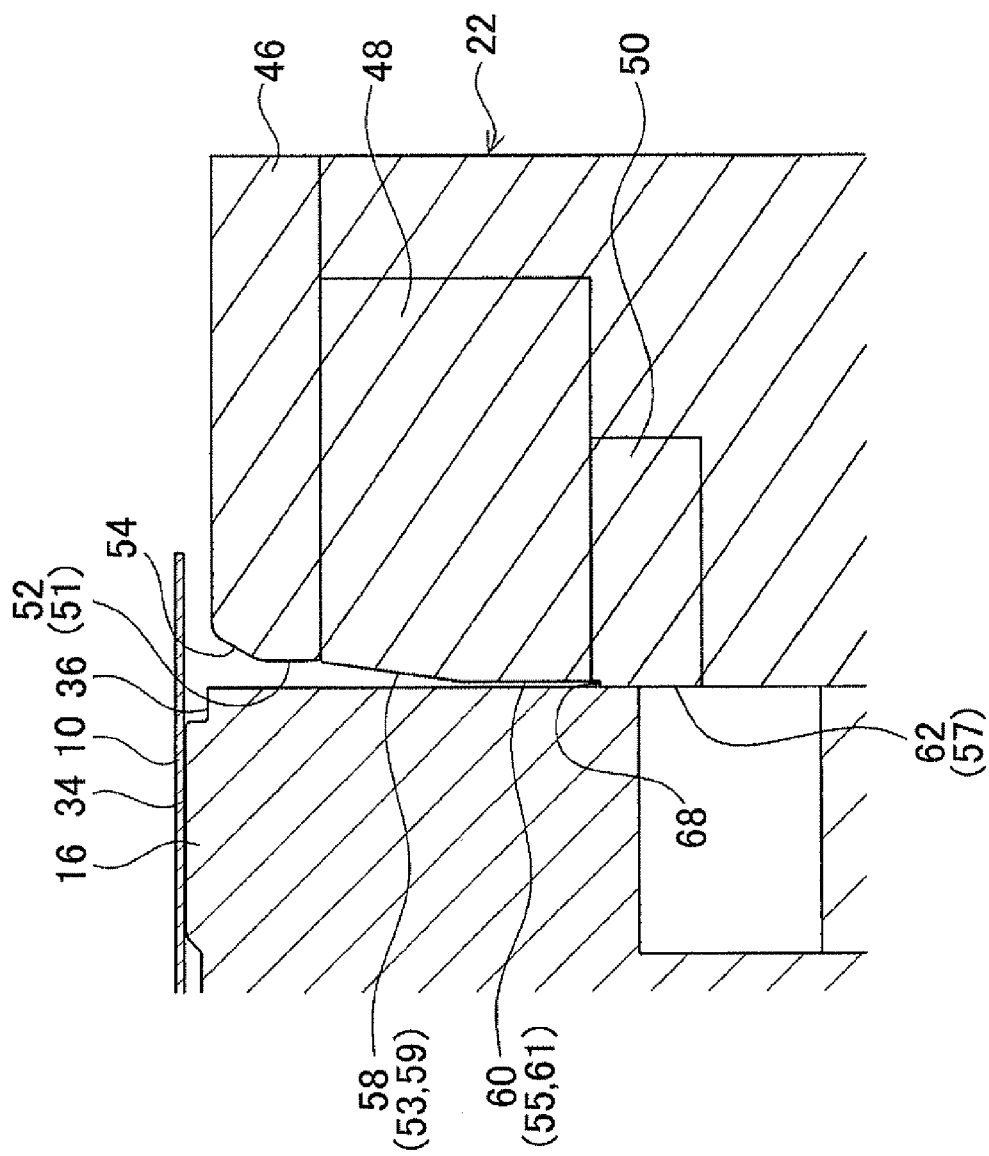
FIG. 2 is an enlarged view showing dies and an essential surrounding portion.

The die portion 22 is formed by a drawing die 46, the reduced-diameter tooth shaping die 48, the backing plate 50, and so forth. The drawing die 46, the reduced-diameter tooth shaping die 48, and the backing plate 50 are sequentially arranged in this order in the direction in which toothed punch 18, the first restraint punch 14, and the second restraint punch 16 are sequentially arranged (downward in FIG. 2). As shown in FIG. 2, a draw shaping hole 51, a diameter-reducing shaping hole 53, a tooth shaping hole 55, and a thickening shaping hole 57, into which the first restraint punch 14, the second restraint punch 16, the toothed punch 18, the compression punch 20, and so forth are to be accommodated, are formed in the inner side of inner peripheral surfaces 52, 59, 61, and 62 of the drawing die 46, a diameter reducing die portion 58, a preliminary tooth shaping die portion 60, and the backing plate 50. FIG. 2 is an enlarged view showing the die portion 22 and an essential surrounding portion.

As shown in FIG. 2, an entrance portion 54 of the inner peripheral surface 52 of the drawing die 46 has a tapered shape with its inside diameter becoming smaller in the direction in which the toothed punch 18 relatively moves with respect to the drawing die 46 (downward in FIG. 2) in a draw shaping process to be discussed later. The reduced-diameter tooth shaping die 48 includes the diameter reducing die portion 58 and the preliminary tooth shaping die portion 60, and further plays a role as a thickening die in a thickened tooth shaping process to be discussed later. The inside diameter of the diameter reducing die portion 58 is gradually reduced in the direction in which the toothed punch 18, the first restraint punch 14, and the second restraint punch 16 are sequentially arranged (downward in FIG. 2). The inside diameter of the preliminary tooth shaping die portion 60 has the same size as the minimum inside diameter of the diameter reducing die portion 58. The preliminary tooth shaping die portion 60 is an example of the "toothed die" according to the present invention.

The inner peripheral surface 59 of the diameter reducing die portion 58 and the inner peripheral surface 61 of the preliminary tooth shaping die portion 60 are formed in a toothed shape in order to form teeth in an inclined side wall portion 82 (see FIG. 9) and the reduced-diameter side wall portion 86 (see FIG. 15) to be discussed later together with the toothed punch 18 described above. The backing plate 50 includes the inner peripheral surface 62 and the chamfer shaping portion 68.

[Manufacturing Method]

Next, a manufacturing method for the toothed part 12 which uses the manufacturing device 1 for a toothed part configured as described above will be described. The manufacturing method for the toothed part 12 according to the embodiment includes the workpiece placement process, a step shaping process, the draw shaping process, a reduced-diameter tooth shaping process, the thickened tooth shaping process, and a releasing process.

<Workpiece Placement Process>

Figure 3:
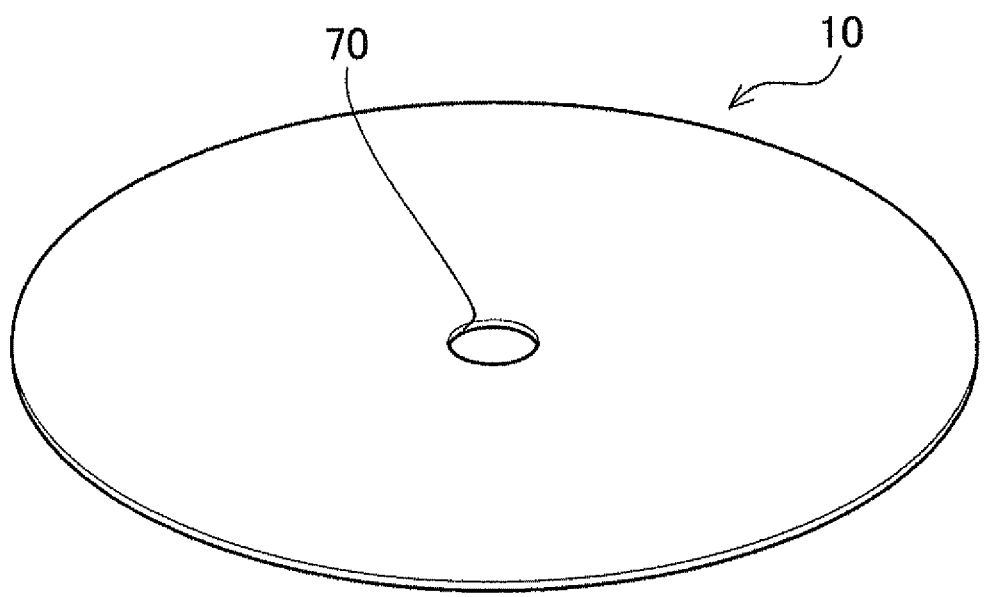
FIG. 3 is a perspective view showing the appearance of a workpiece before being shaped.

First, in the workpiece placement process, as shown in FIG. 1, the workpiece 10 which is a flat disk-shaped material made of a metal is placed on the second distal-end surface 34 of the second restraint punch 16. As shown in FIG. 3, a hole portion 70 is formed in advance in the center portion of the workpiece 10 before being shaped.

Figure 4:
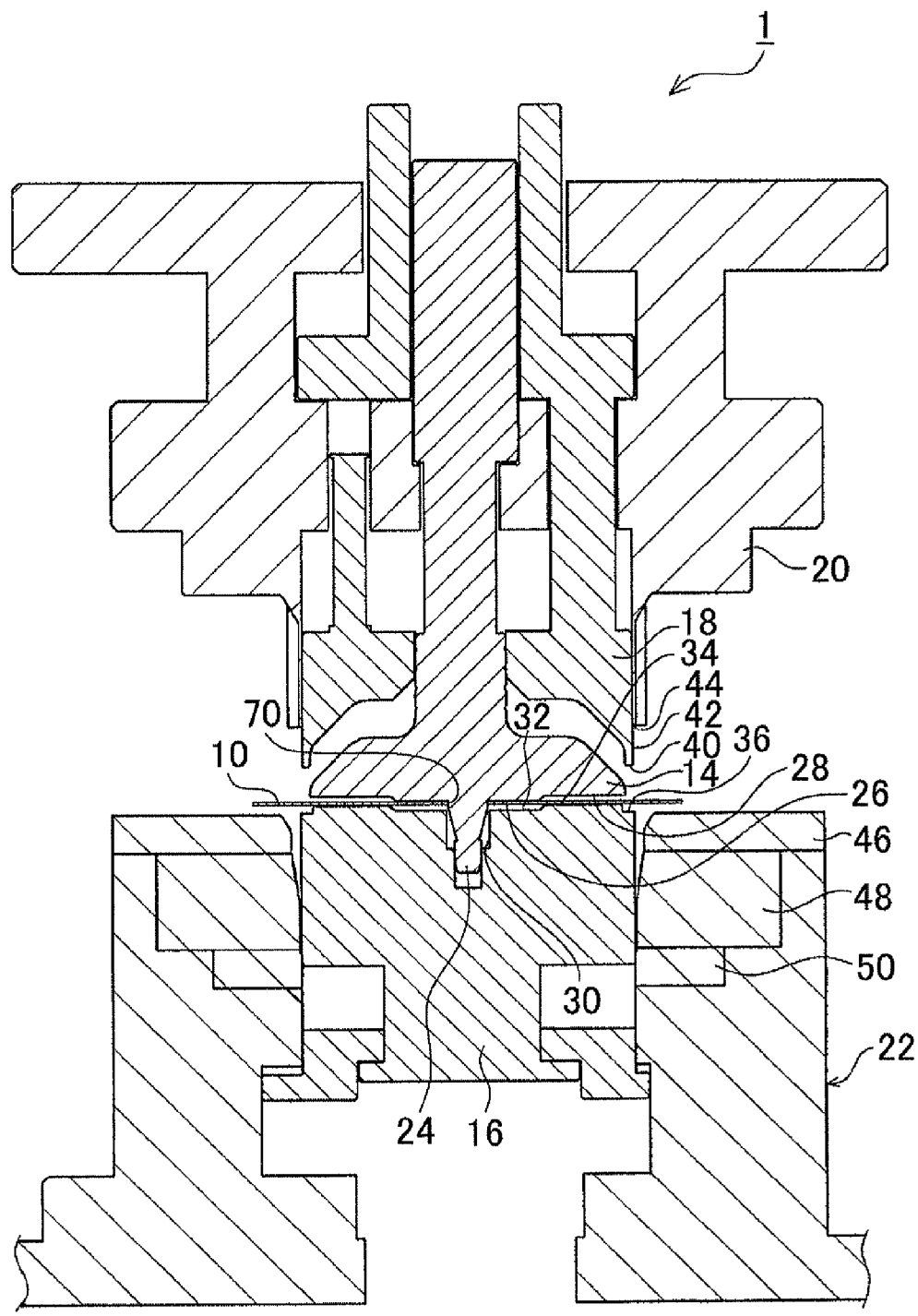
FIG. 4 shows the overall configuration of the manufacturing device for a toothed part in the workpiece placement process.

Then, as shown in FIG. 4, the first restraint punch 14, the toothed punch 18, and the compression punch 20 are advanced with respect to the second restraint punch 16 and the die portion 22 (moved downward in FIG. 4) with the second restraint punch 16 fixed. Then, the first distal-end surface 26 of the first restraint punch 14 is brought into abutment with the workpiece 10 while inserting the projecting portion 24 of the first restraint punch 14 into the hole portion 70 of the workpiece 10. At this time, the projecting portion 24 of the first restraint punch 14 is inserted into the recessed portion 30 of the second restraint punch 16. Inserting the projecting portion 24 of the first restraint punch 14 into the hole portion 70 of the workpiece 10 in this way can restrict the positional relationship between the workpiece 10 and the first restraint punch 14 in the radial direction of the workpiece 10, which allows positioning between the workpiece 10 and each of the shaping dies.

<Step Shaping Process>

Figure 5:
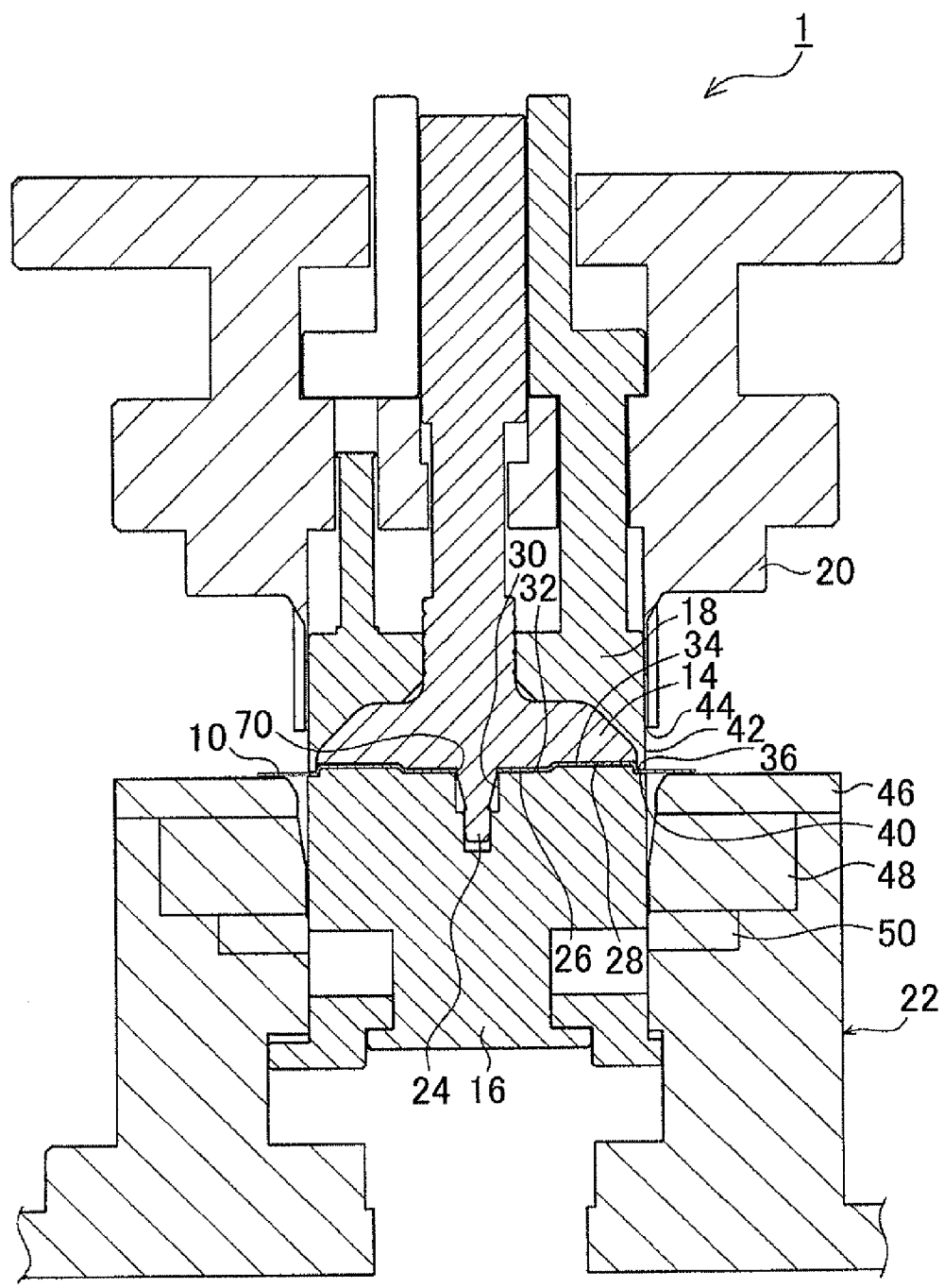
FIG. 5 shows the overall configuration of the manufacturing device for a toothed part in a step shaping process.
Figure 6:
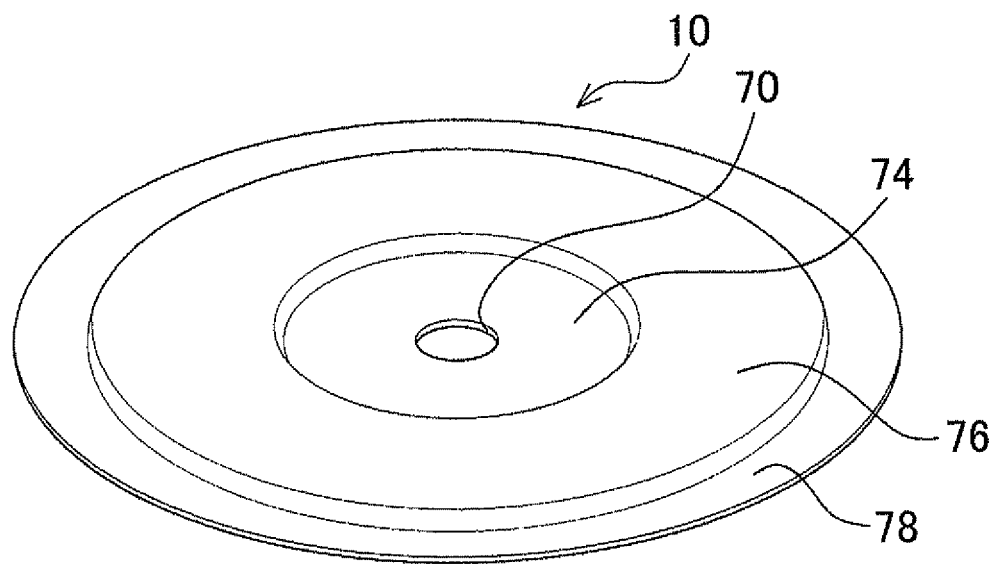
FIG. 6 is a perspective view showing the appearance of the workpiece after the step shaping process is performed.

Next, in the step shaping process, as shown in FIG. 5, the first restraint punch 14, the toothed punch 18, and the compression punch 20 are advanced with respect to the second restraint punch 16 (moved downward in FIG. 5) with the second restraint punch 16 fixed. Then, the first distal-end surface 26 of the first restraint punch 14, the second distal-end surface 28 of the first restraint punch 14, and the distal-end surface 40 of the toothed punch 18 are brought into abutment with the workpiece 10. At this time, the workpiece 10 is pressurized by the first distal-end surface 26 of the first restraint punch 14 and the distal-end surface 40 of the toothed punch 18. Consequently, as shown in FIG. 6, a step is formed between a first portion 74 on the outer side of the hole portion 70 of the workpiece 10 and a second portion 76 on the outer side of the first portion 74. In addition, a step is formed between the second portion 76 of the workpiece 10 and a third portion 78 on the outer side of the second portion 76. In this way, the second portion 76 of the workpiece 10 is projected with respect to the first portion 74 and the third portion 78.

In the toothed part 12 (see FIG. 17) to be discussed later, the first portion 74 of the workpiece 10 corresponds to an inner bottom surface portion 90, and the second portion 76 of the workpiece 10 corresponds to an intermediate bottom surface portion 92. In the toothed part 12 to be discussed later, in addition, a part of the third portion 78 of the workpiece 10 on the inner peripheral side corresponds to an outer bottom surface portion 80.

In this way, the workpiece 10 is interposed and restrained between the first restraint punch 14, the second restraint punch 16, and the toothed punch 18 with a step formed between the first portion 74 of the workpiece 10 and the second portion 76 and between the second portion 76 and the third portion 78.

<Draw Shaping Process>

Figure 7:
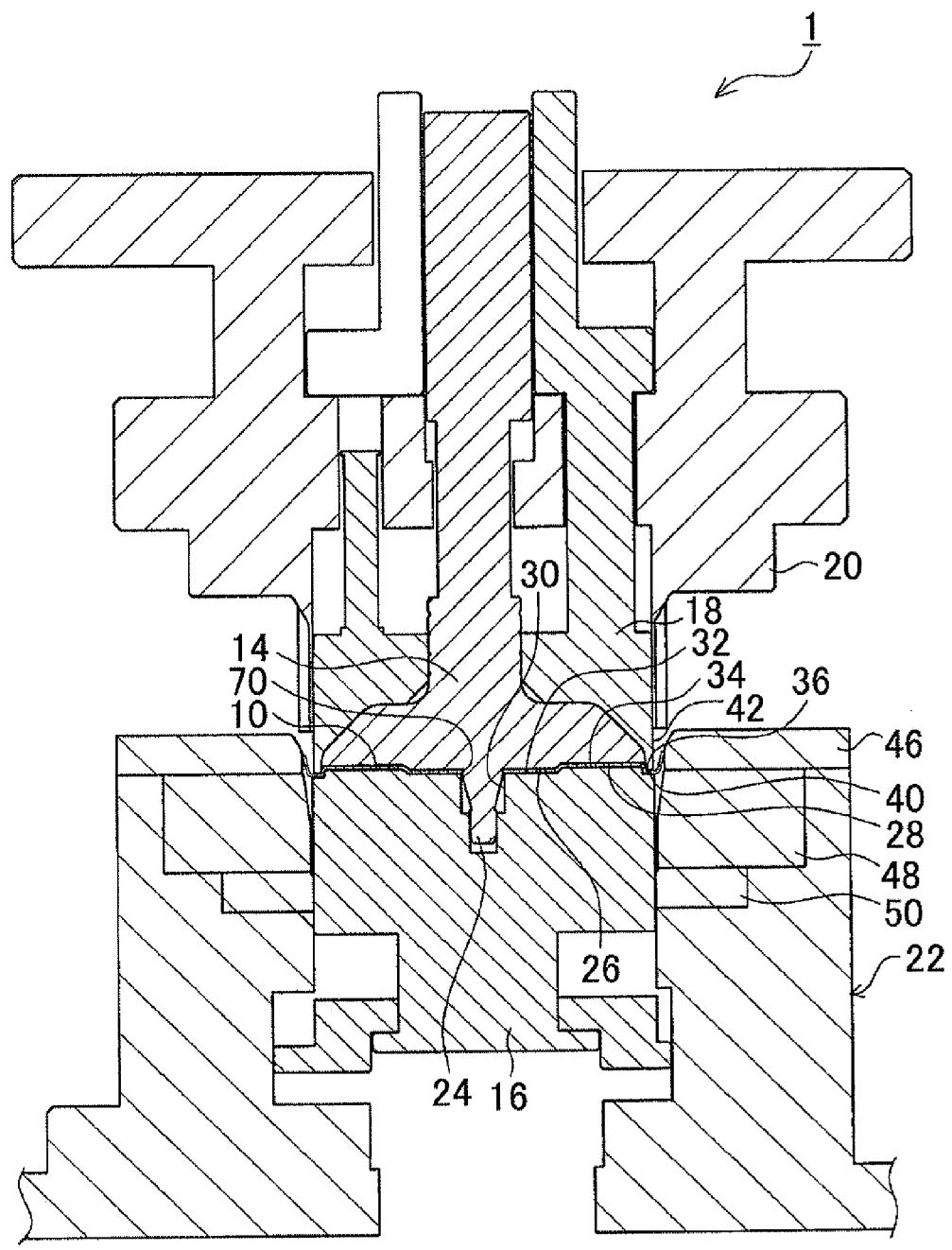
FIG. 7 shows the overall configuration of the manufacturing device for a toothed part in a draw shaping process.

Next, in the draw shaping process, as shown in FIG. 7, the first restraint punch 14, the second restraint punch 16, the toothed punch 18, and the compression punch 20 are relatively advanced with respect to the die portion 22 (moved downward in FIG. 7) with the workpiece 10 interposed and restrained between the first restraint punch 14, the second restraint punch 16, and the toothed punch 18. The draw shaping process is an example of the "half drawing process" according to the present invention.

Figure 8:
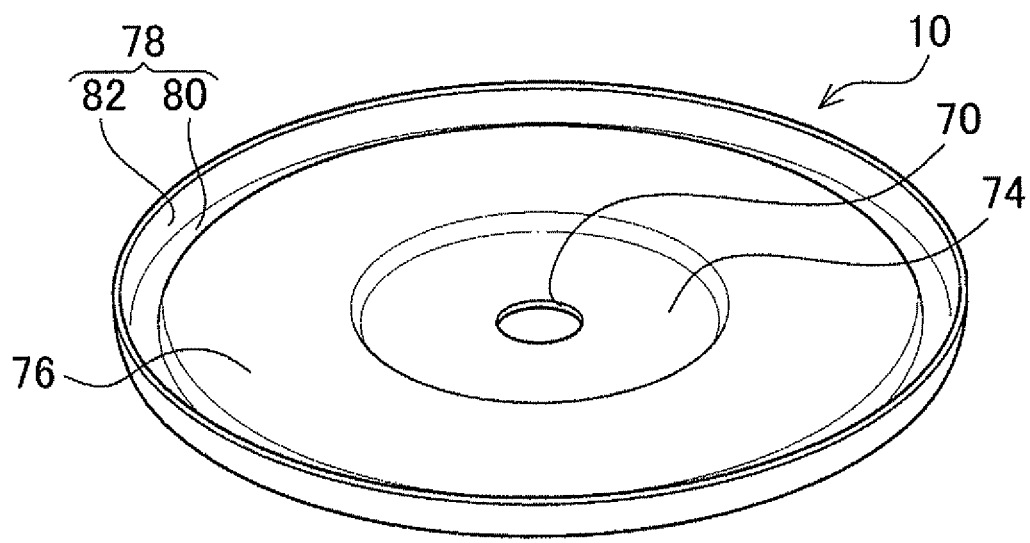
FIG. 8 is a perspective view showing the appearance of the workpiece after the draw shaping process is performed.
Figure 9:
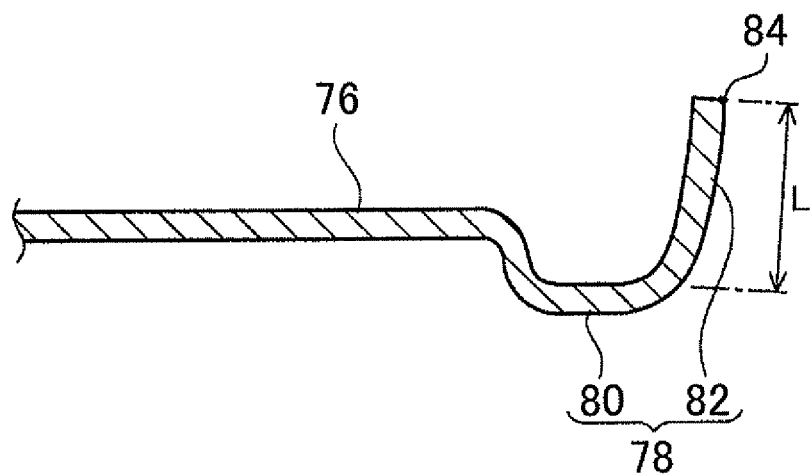
FIG. 9 is an enlarged cross-sectional view of an outer circumferential portion of the workpiece after the draw shaping process is performed.

Consequently, draw shaping is performed on the workpiece 10 by the toothed punch 18 and the drawing die 46 of the die portion 22. Then, as shown in FIGS. 8 and 9, the third portion 78 of the workpiece 10 is bent to form the outer bottom surface portion 80 and the inclined side wall portion 82 provided to extend upright from an outer peripheral end portion of the outer bottom surface portion 80. Here, the inside diameter of the inclined side wall portion 82 becomes gradually larger in the direction away from the outer bottom surface portion 80 so that the inclined side wall portion 82 is formed in a conical shape. The inclined side wall portion 82 is an example of the "side wall portion" according to the present invention.

Figure 10:
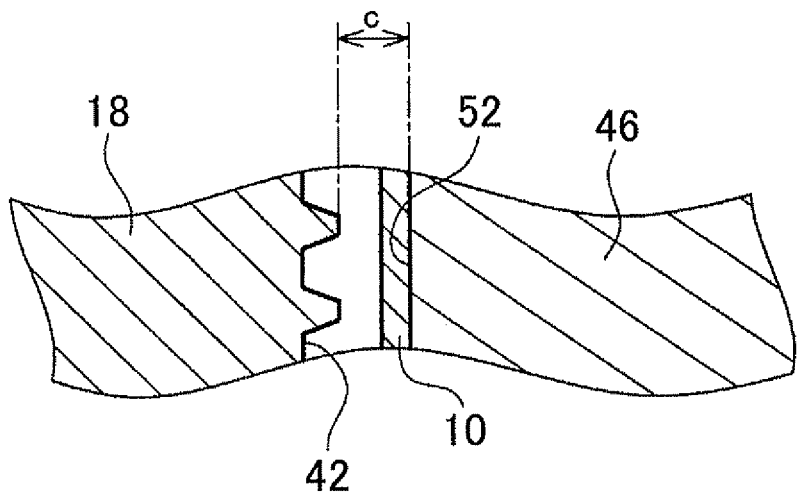
FIG. 10 is a cross-sectional view of the workpiece, a toothed punch, and a drawing die, as seen from the upper side of FIG. 7, in the draw shaping process.

Here, it is desirable that a clearance c (see FIG. 10) between the surface of a large-diameter portion of the outer peripheral surface 42 of the toothed punch 18 and the inner peripheral surface 52 of the drawing die 46 should be determined such that only a distal-end portion 84 (see FIG. 9) of the workpiece 10 contacts the drawing die 46. FIG. 10 is a cross-sectional view of the workpiece 10, the toothed punch 18, and the drawing die 46 as seen from the upper side of FIG. 7.

Providing the clearance c between the toothed punch 18 and the drawing die 46 in this way causes only the distal-end portion 84 of the workpiece 10 to contact the inner peripheral surface 52 of the drawing die 46 in the draw shaping process. Therefore, the area of contact between the workpiece 10 and the drawing die 46 can be reduced. Thus, the friction force that may be generated between the workpiece 10 and the drawing die 46 can be reduced to prevent thinning of a portion of the workpiece 10 that contacts the outer peripheral surface 42 of the toothed punch 18, on which teeth are formed.

If it is attempted to forcibly form the inclined side wall portion 82 into a cylindrical shape with the clearance between the toothed punch 18 and the drawing die 46 reduced as in the related art, the distal-end surface 40 of the toothed punch 18 may contact the workpiece 10 along a line to thin the outer bottom surface portion 80. By forming the inclined side wall portion 82 into a conical shape with the clearance c between the toothed punch 18 and the drawing die 46 increased as in the embodiment, however, a force applied from the toothed punch 18 to the workpiece 10 can be suppressed to prevent thinning of the workpiece 10.

In addition, the entrance portion 54 of the drawing die 46 is tapered. Thus, only the distal-end portion 84 of the workpiece 10 can be caused to reliably contact the inner peripheral surface 52 of the drawing die 46 when the workpiece 10 is advanced with respect to the die portion 22. Therefore, draw shaping can be smoothly performed on the workpiece 10 to prevent thinning of the workpiece 10.

It is desirable that the clearance c between the toothed punch 18 and the drawing die 46 should be smaller than a length L (see FIG. 9) of a portion of the third portion 78 of the workpiece 10 that is on the outer side with respect to a portion at which the workpiece 10 contacts the outer peripheral surface 42 of the toothed punch 18. This allows draw shaping to be more reliably performed on the workpiece 10 by the toothed punch 18 and the drawing die 46.

<Reduced-diameter Tooth Shaping Process>

Figure 12:
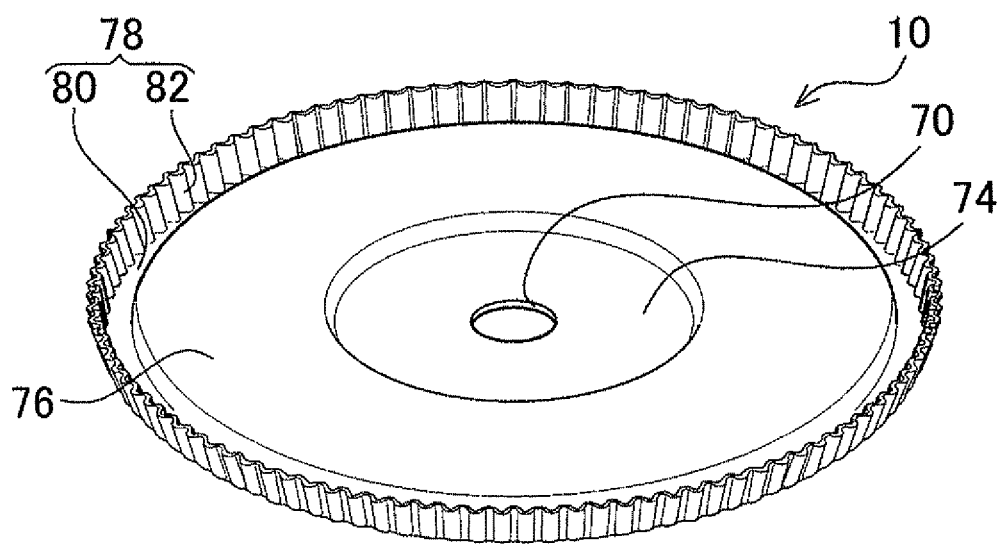
FIG. 12 is a perspective view showing the appearance of the workpiece with teeth formed in an inclined side wall portion.

Next, in the reduced-diameter tooth shaping process, as shown in FIG. 11, the first restraint punch 14, the second restraint punch 16, the toothed punch 18, and the compression punch 20 are relatively advanced with respect to the die portion 22 (moved downward in FIG. 11) with the workpiece 10 interposed and restrained between the first restraint punch 14, the second restraint punch 16, and the toothed punch 18. Then, diameter-reducing shaping (which is an example of the "diameter reducing process" according to the present invention) is performed on the workpiece 10 by the toothed punch 18 and the diameter reducing die portion 58 (see FIG. 2) of the die portion 22. Teeth are formed on the inner peripheral surface 59 of the diameter reducing die portion 58. Thus, as shown in FIG. 12, teeth are gradually formed in the inclined side wall portion 82 of the workpiece 10 at the same time in the diameter-reducing shaping.

Figure 13:
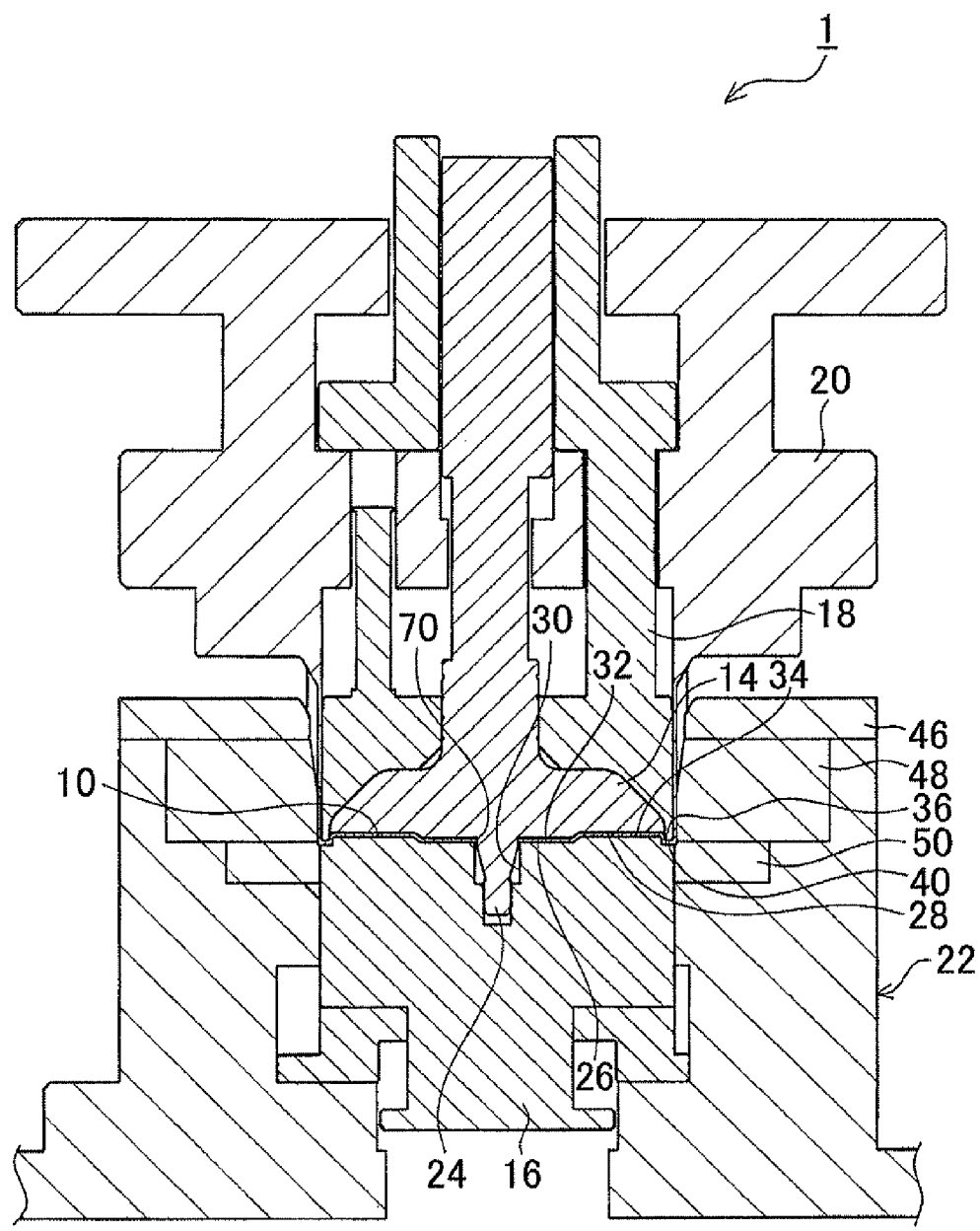
FIG. 13 shows the overall configuration of the manufacturing device for a toothed part after the reduced-diameter tooth shaping process is performed.
Figure 14:
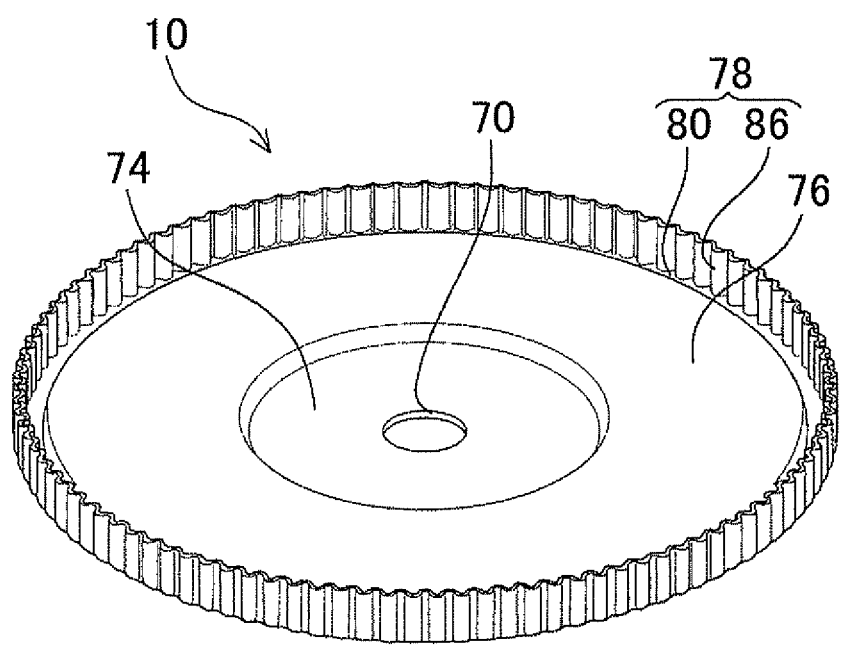
FIG. 14 is a perspective view showing the appearance of the workpiece after the reduced-diameter tooth shaping process is performed.
Figure 15:
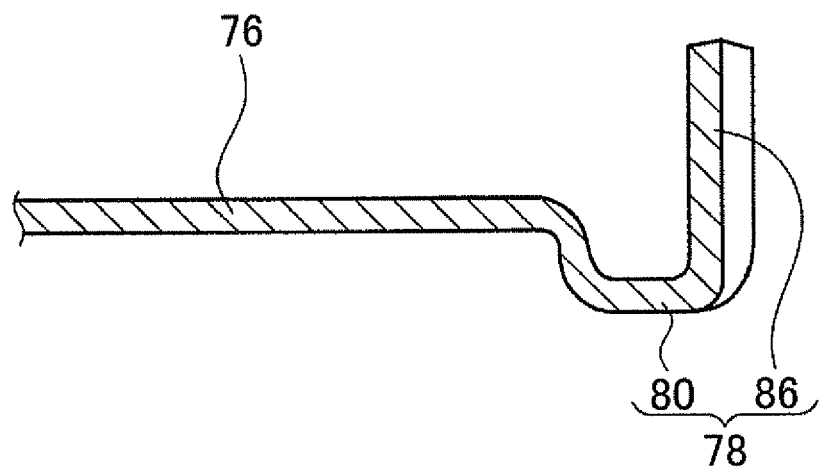
FIG. 15 is an enlarged cross-sectional view of the outer circumferential portion of the workpiece after the reduced-diameter tooth shaping process is performed.

When the first restraint punch 14, the second restraint punch 16, the toothed punch 18, and the compression punch 20 are further relatively advanced with respect to the die portion 22 (moved downward in FIG. 11), preliminary tooth shaping (which is an example of the "tooth shaping process" according to the present invention) is performed on the workpiece 10 by the toothed punch 18 and the preliminary tooth shaping die portion 60 (see FIG. 2) of the die portion 22 as shown in FIG. 13. Consequently, as shown in FIGS. 14 and 15, the reduced-diameter side wall portion 86, which is provided to extend vertically upright from the outer bottom surface portion 80 in the third portion 78 of the workpiece 10 and in which teeth are formed, is formed. The reduced-diameter side wall portion 86 is an example of the "side wall portion" according to the present invention.

In this way, the inside diameter of the inclined side wall portion 82 of the workpiece 10 is gradually reduced in the reduced-diameter tooth shaping process, which allows the diameter-reducing shaping to be naturally performed on the workpiece 10. Thus, it is possible to prevent thinning of the workpiece 10 at a corner portion between the outer bottom surface portion 80 and the inclined side wall portion 82, and to secure a sufficient thickness.

Teeth are formed in the diameter reducing die portion 58, and teeth are gradually formed in the inclined side wall portion 82 of the workpiece 10 at the same time in the diameter-reducing shaping. Thus, teeth can be naturally formed in the reduced-diameter side wall portion 86 of the workpiece 10 in the preliminary tooth shaping. Therefore, thinning of the workpiece 10 can be prevented.

In addition, it is possible to reduce the area of contact, and hence the resistance of contact, between the workpiece 10 and the shaping dies by performing the diameter-reducing shaping using a small-diameter portion of the reduced-diameter tooth shaping die 48 compared to a case where a round shaping die, in the inner peripheral surface of which no teeth are formed, is used. This reduces the force acting on the large-diameter portion at the distal end of the toothed punch 18 during the diameter-reducing shaping, which reliably prevents thinning of the workpiece 10.

<Thickened Tooth Shaping Process>

Figure 16:
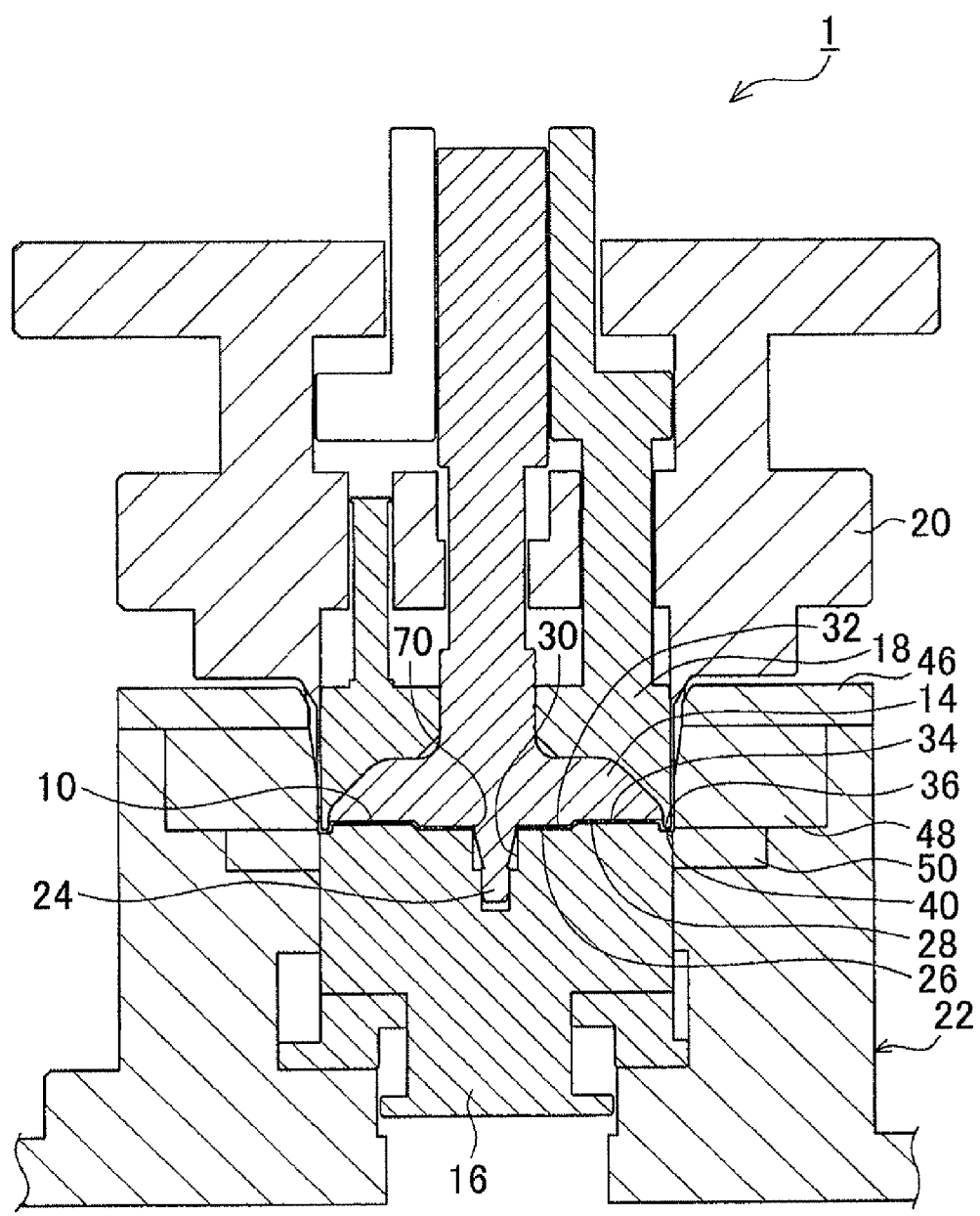
FIG. 16 shows the overall configuration of the manufacturing device for a toothed part in a thickened tooth shaping process.

Next, in the thickened tooth shaping process, as shown in FIG. 16, the compression punch 20 is advanced with respect to the die portion 22 with the workpiece 10 interposed and restrained between the first restraint punch 14, the second restraint punch 16, and the toothed punch 18.

Figure 17:
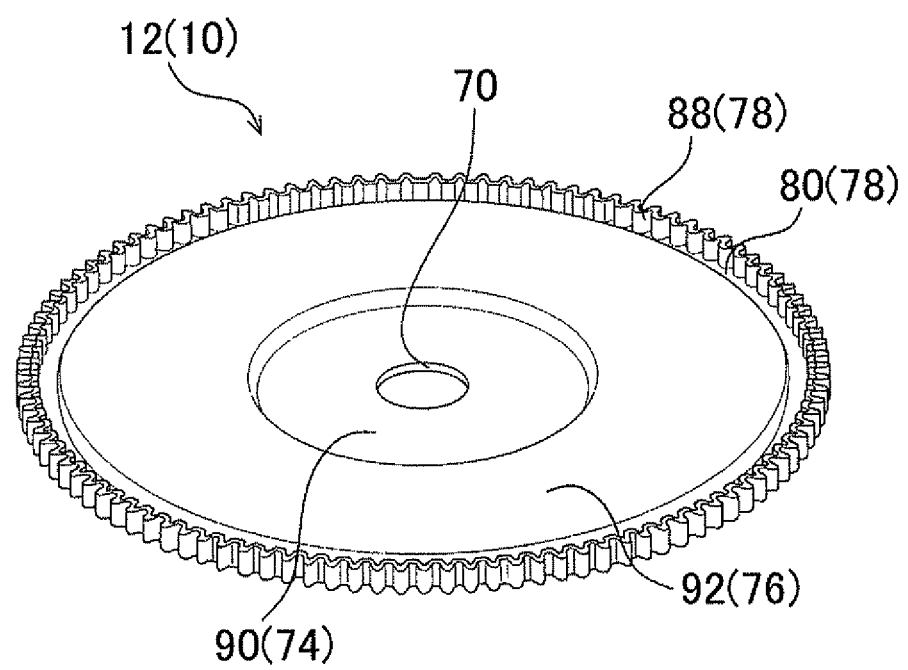
FIG. 17 is a perspective view showing the appearance of the workpiece after the thickened tooth shaping process is performed.

Consequently, the reduced-diameter side wall portion 86 (see FIG. 15) of the workpiece 10 is compressed by the compression punch 20 so that thickened tooth shaping is performed. Then, the material flows into spaces of the large-diameter portion of the reduced-diameter tooth shaping die 48 so that a thickened toothed shape is formed. Consequently, as shown in FIGS. 17 and 18, the reduced-diameter side wall portion 86 of the workpiece 10 is thickened so that the toothed part 12 with a side wall portion 88 formed with thickened teeth is formed.

Here, thinning of the workpiece 10 is prevented in the draw shaping process and the reduced-diameter tooth shaping process described above. Thus, the toothed part 12 in a desired shape with the side wall portion 88 can be reliably formed in the thickened tooth shaping process.

Figure 19:
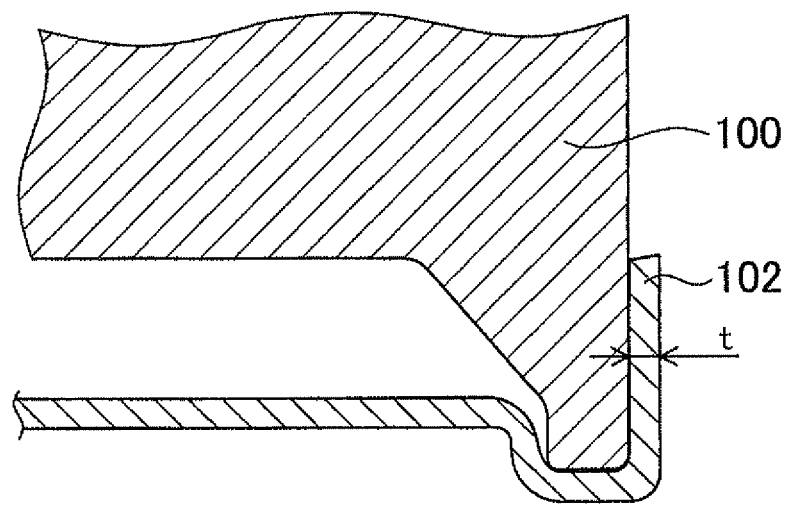
FIG. 19 illustrates tooth shaping according to the related art.
Figure 20:
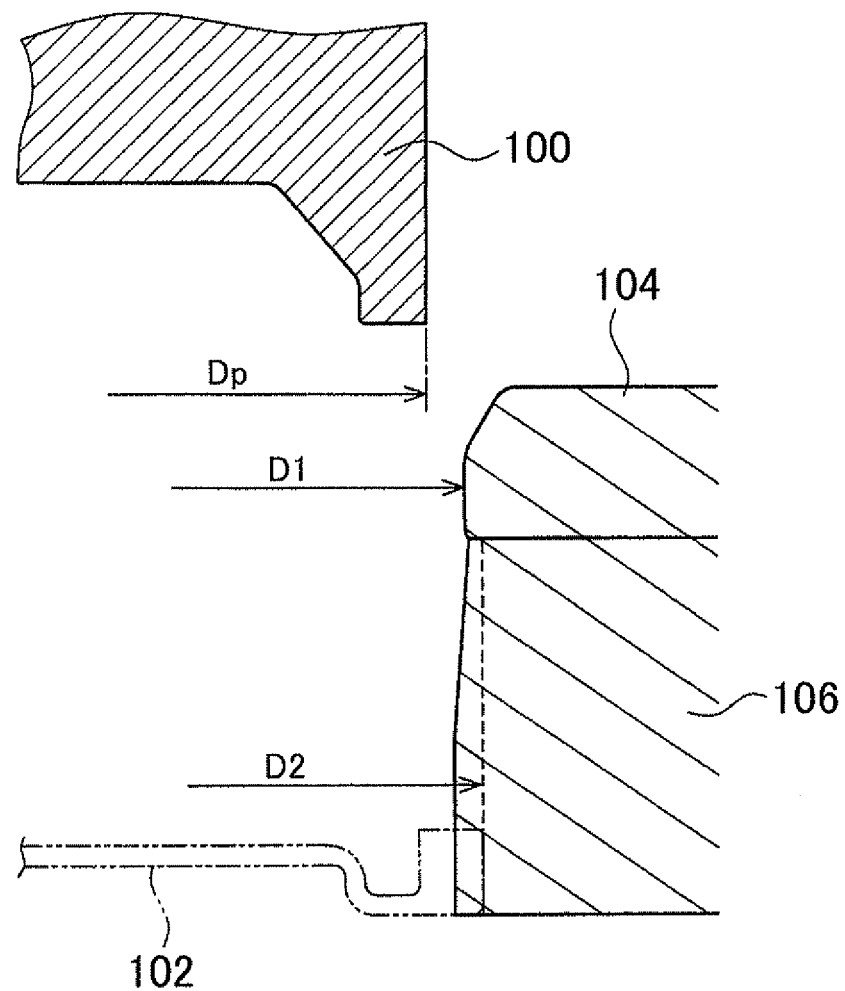
FIG. 20 shows an issue to be addressed in the tooth shaping according to the related art.

In the related art, tooth shaping is performed after a workpiece is shaped into a cup shape conforming to the shape of a toothed punch in a drawing process. Therefore, as shown in FIGS. 19 and 20, it is necessary that defining the diameter of a drawing die 104 as D1, the diameter of a toothed punch 100 as Dp, and the thickness of a workpiece 102 as t, D1=Dp+t should be met. However, if it is attempted to vertically stack the drawing die 104 and a toothed die 106 on each other as shown in FIG. 20 in the case where the larger diameter D2 of external teeth of the workpiece 102 after being shaped is larger than the diameter D1 of the drawing die 104 in a tooth shaping process in which teeth are formed by the toothed die 106 while a compression punch (not shown) is compressing a side wall portion of the workpiece 102 for thickening, the compression punch and the drawing die 104 may interfere with each other, or the workpiece 102 after being shaped may not be released. Therefore, the processes must be split at a point before the tooth shaping process. Thus, in order to perform the draw shaping, the preliminary tooth shaping, and the thickened (compressed) tooth shaping in one stroke operation, it is necessary to perform the reduced-diameter tooth shaping process using the reduced-diameter tooth shaping die 48 and thereafter the thickened tooth shaping process as in the embodiment.

<Releasing Process>

Figure 21:
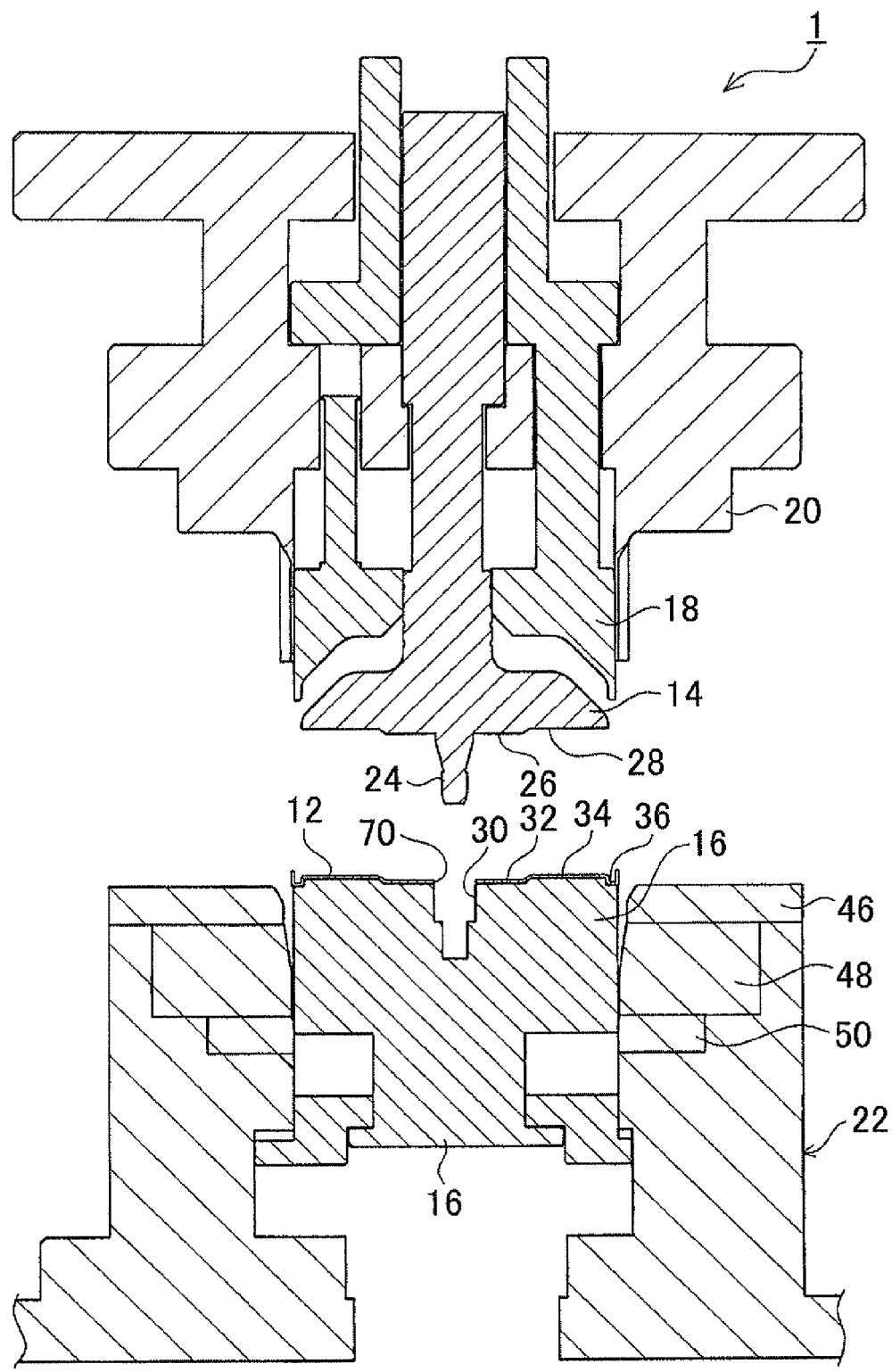
FIG. 21 shows the overall configuration of the manufacturing device for a toothed part in a releasing process.

Next, in the releasing process, as shown in FIG. 21, the first restraint punch 14, the second restraint punch 16, the toothed punch 18, and the compression punch 20 are retracted with respect to the die portion 22, and further the first restraint punch 14, the toothed punch 18, and the compression punch 20 are retracted with respect to the second restraint punch 16. Then, the toothed part 12 is taken out of the manufacturing device 1.

In this way, the toothed part 12 (see FIG. 17) including the bottom surface portion (the inner bottom surface portion 90, the intermediate bottom surface portion 92, and the outer bottom surface portion 80) and the side wall portion 88 provided to extend vertically upright from an outer peripheral end portion of the outer bottom surface portion 80 of the bottom surface portion can be manufactured from the workpiece 10 having a disk shape.

Figure 22:
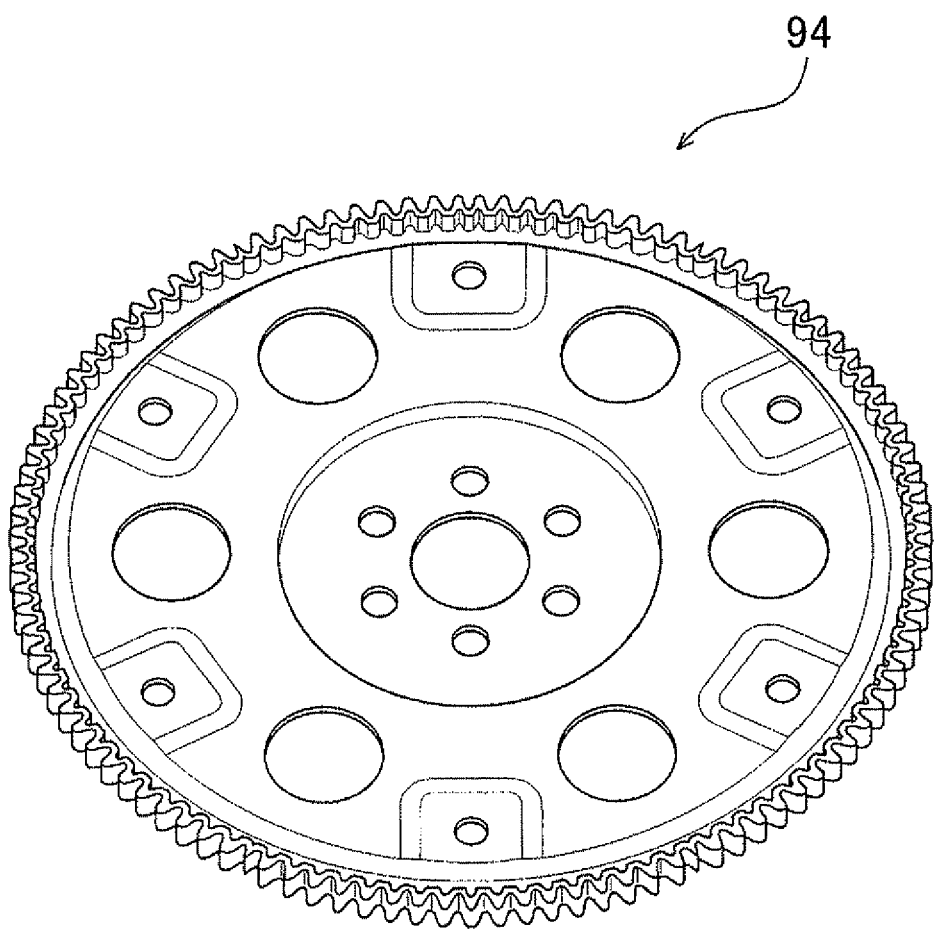
FIG. 22 is a perspective view showing the appearance of a drive plate formed integrally with a ring gear.

The toothed part 12 formed as described above can thereafter be subjected to a heat treatment or a hole forming process to form a drive plate 94 formed integrally with a ring gear as shown in FIG. 22, for example. The drive plate 94 formed integrally with a ring gear may serve as a power transfer part that links an engine of a vehicle and a torque converter of a transmission to each other. In the related art, two parts, namely a drive plate and a ring gear, are manufactured to be joined to each other by welding. According to the embodiment, however, the drive plate 92 formed integrally with a ring gear can be manufactured by pressing from the single workpiece 10 in a flat plate shape.

[Effects of the Embodiment]

In the embodiment, in the draw shaping process, the inclined side wall portion 82 is formed such that its inside diameter becomes larger in the direction away from the bottom surface portion (the first portion 74, the second portion 76, and the outer bottom surface portion 80 in the third portion 78). Thus, the draw shaping can be performed with a force applied to the workpiece 10 suppressed compared to a case where a workpiece is shaped into a cup shape as in the draw shaping according to Japanese Patent Application Publication No. 2006-116593. Therefore, thinning of the workpiece 10 can be prevented. Thus, the toothed part 12 in a desired shape can be manufactured using shaping dies with a simple structure.

In the draw shaping process, the toothed punch 18 is used, which eliminates the need to use a punch exclusively for drawing. Thus, the structure of the shaping dies can be simplified.

The sufficient clearance c between the toothed punch 18 and the drawing die 46 can be secured to reduce the area of contact between the workpiece 10 and the drawing die 46. Therefore, the friction force that may be generated between the workpiece 10 and the drawing die 46 can be reduced. Thus, thinning of a portion of the workpiece 10 at which it contacts the outer peripheral surface 42 of the toothed punch 18 can be prevented. In addition, the outer peripheral portion of the workpiece 10 is drawn into a conical shape. Thus, thinning of the material can be prevented by suppressing a force to be applied from the toothed punch 18 to the workpiece 10.

In the draw shaping process, the workpiece 10 is drawn along the tapered entrance portion 54 of the drawing die 46. Thus, the draw shaping is performed smoothly, which prevents thinning of the workpiece 10.

The diameter reducing process is performed between the draw shaping process and the tooth shaping process. Thus, the reduced-diameter side wall portion 86 can be formed by gradually reducing the inside diameter of the inclined side wall portion 82 of the workpiece 10. Therefore, the diameter-reducing shaping can be naturally performed on the workpiece 10, which prevents thinning of the workpiece 10.

Teeth can be gradually formed in the inclined side wall portion 82 also in the diameter reducing process. Thus, teeth can be naturally formed in the reduced-diameter side wall portion 86 of the workpiece 10. Therefore, thinning of the workpiece 10 can be prevented.

In the embodiment, the workpiece 10 is shaped to manufacture the toothed part 12 in one stroke operation. Thus, each of the processes can be performed at one location to reduce the size of the manufacturing device 1. Here, the term "one stroke operation" means an operation in which the shaping dies (the first restraint punch 14, the second restraint punch 16, the toothed punch 18, and the compression punch 20) are moved in one direction.

The embodiment described above is merely illustrative, and does not limit the present invention in any way. It is a matter of course that various improvements and modifications may be made without departing from the scope and spirit of the present invention.

What is claimed is:

1. A manufacturing method for a toothed part including a bottom surface portion and a side wall portion that extends upright from an outer peripheral end portion of the bottom surface portion, the side wall portion being formed with teeth, the manufacturing method for the toothed part comprising:
   a half drawing process of performing draw shaping on a material having a disk shape with a toothed punch and a drawing die to form the bottom surface portion and the side wall portion such that an inside diameter of the side wall portion becomes larger in a direction away from the bottom surface portion and the side wall portion is conical in shape; and a tooth shaping process of forming the teeth in the side wall portion with the toothed punch and a tooth die, wherein:

in the half drawing process, a distal-end portion of an opening end side of the side wall portion does not contact the toothed punch when the distal-end portion contacts an inner peripheral surface of the drawing die, and the tooth shaping process is performed after the distal-end portion contacts the inner peripheral surface of the drawing die.

2. The manufacturing method for a toothed part according to claim 1, wherein:

the half drawing process includes forming the side wall portion using the toothed punch and the drawing die such that the drawing die is disposed outward of the toothed punch.

3. The manufacturing method for a toothed part according to claim 2, wherein:

the drawing die is stationary during the half drawing process, and the inner peripheral surface of the drawing die is provided with a tapered portion, an inside diameter of the tapered portion becoming smaller in a direction in which the toothed punch moves with respect to the drawing die in the half drawing process.

4. The manufacturing method for a toothed part according to claim 1, further comprising:

a diameter reducing process of reducing the inside diameter of the side wall portion formed in the half drawing process, wherein the diameter reducing process is followed by the tooth shaping process.

5. The manufacturing method for a toothed part according to claim 2, further comprising:

a diameter reducing process of reducing the inside diameter of the side wall portion formed in the half drawing process, wherein the diameter reducing process is followed by the tooth shaping process.

6. The manufacturing method for a toothed part according to claim 3, further comprising:

a diameter reducing process of reducing the inside diameter of the side wall portion formed in the half drawing process, wherein the diameter reducing process is followed by the tooth shaping process.

7. The manufacturing method for a toothed part according to claim 4, wherein the diameter reducing process includes disposing a diameter reducing die, an inner peripheral surface of which is formed with teeth, outward of the toothed punch to form the teeth in the side wall portion.

8. The manufacturing method for a toothed part according to claim 5, wherein the diameter reducing process includes disposing a diameter reducing die, an inner peripheral surface of which is formed with teeth, outward of the toothed punch to form the teeth in the side wall portion.

9. The manufacturing method for a toothed part according to claim 6, wherein the diameter reducing process includes disposing a diameter reducing die, an inner peripheral surface of which is formed with teeth, outward of the toothed punch to form the teeth in the side wall portion.

10. The manufacturing method for a toothed part according to claim 1, wherein the inner peripheral surface of the drawing die includes an inner diameter that is the smallest inner diameter of drawing shaping holes in the drawing die.

* * * * *